United States Patent
Murzyn

(10) Patent No.: US 10,274,725 B2
(45) Date of Patent: Apr. 30, 2019

(54) HEAD-UP DISPLAY WITH SECOND HIGH INTENSITY LIGHTING UNIT INSTALLED OUTSIDE OF FIRST DISPLAY CASING

(71) Applicant: DENSO International America, Inc., Southfield, MI (US)

(72) Inventor: Michael Murzyn, West Bloomfield, MI (US)

(73) Assignee: DENSO International America, Inc., Southfield, MI (US)

( * ) Notice: Subject to any disclaimer, the term of this patent is extended or adjusted under 35 U.S.C. 154(b) by 200 days.

(21) Appl. No.: 15/430,609

(22) Filed: Feb. 13, 2017

(65) Prior Publication Data

US 2017/0363866 A1    Dec. 21, 2017

Related U.S. Application Data

(60) Provisional application No. 62/352,304, filed on Jun. 20, 2016.

(51) Int. Cl.
*G02B 27/01* (2006.01)
*B60Q 3/10* (2017.01)
*F21V 29/76* (2015.01)

(52) U.S. Cl.
CPC ............ *G02B 27/0101* (2013.01); *B60Q 3/10* (2017.02); *B60R 2300/205* (2013.01);
(Continued)

(58) Field of Classification Search
CPC . G02B 27/01; G02B 27/0101–27/0189; G02B 27/017; G02B 2027/0141; G02B 2027/014; G02B 2027/0101; G02B 2027/0198; G02B 2027/017; G09G 2380/10; G06F 3/011–3/015; G06F 3/012; B60K 35/00; B60K 35/02; B60K 35/04; B60K 2350/00; B60K 2350/10; B60K 2350/1004; B60K 2350/1056; B60K 2350/106; B60K 2350/1064; B60K 2350/1068; B60K 2350/1072;
(Continued)

(56) References Cited

U.S. PATENT DOCUMENTS 5,140,465 A * 8/1992 Yasui .................... G02B 27/01
                                                         359/631
5,386,216 A * 1/1995 Iino ........................ B60K 37/02
                                                         340/980
(Continued)

*Primary Examiner* — Darlene M Ritchie
(74) *Attorney, Agent, or Firm* — Harness, Dickey & Pierce, P.L.C.

(57) ABSTRACT

The present disclosure provides a head-up display that has a first lighting unit to display first information on a windshield. The first lighting unit includes a first lighting source that emits light for the windshield as the first information and a first cylindrical casing that accommodates the first lighting source therein. The head-up display further has a second lighting unit to display second information on the windshield. The second lighting unit includes a second lighting source that emits light for the windshield as the second information. The head-up display further has a package disposed under the windshield. The first and second lighting units are installed on the package. The second lighting unit is installed on the package independently from the first lighting unit.

11 Claims, 4 Drawing Sheets

(52) U.S. Cl.
CPC ...... *F21V 29/767* (2015.01); *G02B 2027/014* (2013.01); *G02B 2027/0141* (2013.01); *G09G 2380/10* (2013.01)

(58) Field of Classification Search
CPC .... B60K 2350/2052; B60K 2350/2056; B60Q 3/10; B60Q 3/12; B60Q 3/14; B60R 2300/205
See application file for complete search history.

(56) References Cited

U.S. PATENT DOCUMENTS

| | | | | |
|---|---|---|---|---|
| 6,608,608 | B2* | 8/2003 | Kanamori | G02B 27/01 307/10.1 |
| 7,982,959 | B1* | 7/2011 | Lvovskiy | G02B 27/01 348/115 |
| 9,651,779 | B2* | 5/2017 | Takasu | G02B 27/01 |
| 10,189,405 | B2* | 1/2019 | Boyd | B60Q 9/00 |
| 2002/0135573 | A1 | 9/2002 | Kanamori | |
| 2005/0273218 | A1* | 12/2005 | Breed | B60C 11/24 701/2 |
| 2008/0186156 | A1* | 8/2008 | Uematsu | B60K 35/00 340/441 |
| 2010/0067118 | A1* | 3/2010 | Takahashi | G02B 27/01 359/633 |
| 2012/0075708 | A1* | 3/2012 | Hagiwara | B60K 35/00 359/630 |
| 2012/0127749 | A1* | 5/2012 | Kuo | G02B 6/0085 362/600 |
| 2012/0200476 | A1* | 8/2012 | Kanamori | G02B 27/0101 345/7 |
| 2012/0256812 | A1* | 10/2012 | Aoki | G02B 27/0101 345/7 |
| 2013/0114240 | A1* | 5/2013 | Makita | G01D 13/28 362/23.19 |
| 2014/0253821 | A1* | 9/2014 | Takatoh | B60K 35/00 349/11 |
| 2015/0042751 | A1* | 2/2015 | Leary | B60R 1/00 348/36 |
| 2015/0092118 | A1* | 4/2015 | Hada | B60K 35/00 349/11 |
| 2015/0149079 | A1* | 5/2015 | Breed | G01C 21/365 701/428 |
| 2016/0243984 | A1* | 8/2016 | Aoki | B60K 35/00 |
| 2016/0288705 | A1* | 10/2016 | Henon | G02B 27/01 |
| 2017/0059864 | A1* | 3/2017 | Takahashi | B60K 35/00 |
| 2017/0199381 | A1* | 7/2017 | Kuwabara | B60K 35/00 |
| 2017/0307883 | A1* | 10/2017 | Yamasaki | B60K 35/00 |
| 2017/0343806 | A1* | 11/2017 | Anzai | B60J 1/00 |

* cited by examiner

HEAD-UP DISPLAY WITH SECOND HIGH INTENSITY LIGHTING UNIT INSTALLED OUTSIDE OF FIRST DISPLAY CASING

CROSS-REFERENCE TO RELATED APPLICATIONS

This application claims the benefit of U.S. Provisional Application No. 62/352,304, filed on Jun. 20, 2016.

FIELD

The present disclosure relates to a head-up display.

BACKGROUND

This section provides background information related to the present disclosure which is not necessarily prior art.

An onboard displaying device including a head-up display has been used for a vehicle to form virtual images of information, including traveling speed and warning patterns of a vehicle, transmitted from a liquid crystal display (LCD) panel in front of a front windshield. Generally, a conventional head-up display may have a lighting source located in a rear part of the LCD panel. The lighting source may have a first light emitting diode (LED) group and a second LED group. LEDs in the second LED group may have higher directivity than LEDs in the first LED group and may be located above the LEDs in the second LED group. The LCD panel may receive light emitted from the LEDs through a diffusion plate, and may display high priority information on an entire display surface of the LCD panel. It also may receive light emitted from the LEDs, and may display low priority information on a partial display surface.

In sum, the conventional head-up display may have the lighting source and the LCD panel integrally, and the lighting source and the LCD panel may be accommodated in a cylindrical casing together, which may be placed behind an instrument panel. In such a structure, there may be a concern of thermal damage of the LCD panel due to heat from the second LED group because the second LED may have high directivity so that the second LED may generate high heat. As the directivity of the second LED group may increase, lighting intensity of the second LED group may increase correspondingly. Thus, as the lighting intensity of the second LED group increases, heat generated in the cylindrical casing may increase correspondingly.

SUMMARY

This section provides a general summary of the disclosure, and is not a comprehensive disclosure of its full scope or all of its features.

An aspect of the present disclosure provides a head-up display that has a first lighting unit to display first information on a windshield. The first lighting unit includes a first lighting source that emits light for the windshield as the first information and a first cylindrical casing that accommodates the first lighting source therein. The head-up display further has a second lighting unit to display second information on the windshield. The second lighting unit includes a second lighting source that emits light for the windshield as the second information. The head-up display further has a package disposed under the windshield. The first and second lighting units are installed on the package. The second lighting unit is installed on the package independently from the first lighting unit.

Further areas of applicability will become apparent from the description provided herein. The description and specific examples in this summary are intended for purposes of illustration only and are not intended to limit the scope of the present disclosure.

DRAWINGS

The above and other objects, features and advantages of the present invention will become more apparent from the following detailed description made with reference to the accompanying drawings. The drawings described herein are for illustrative purposes only of selected embodiments and not all possible implementations, and are not intended to limit the scope of the present disclosure.

DETAILED DESCRIPTION

Figure 1:
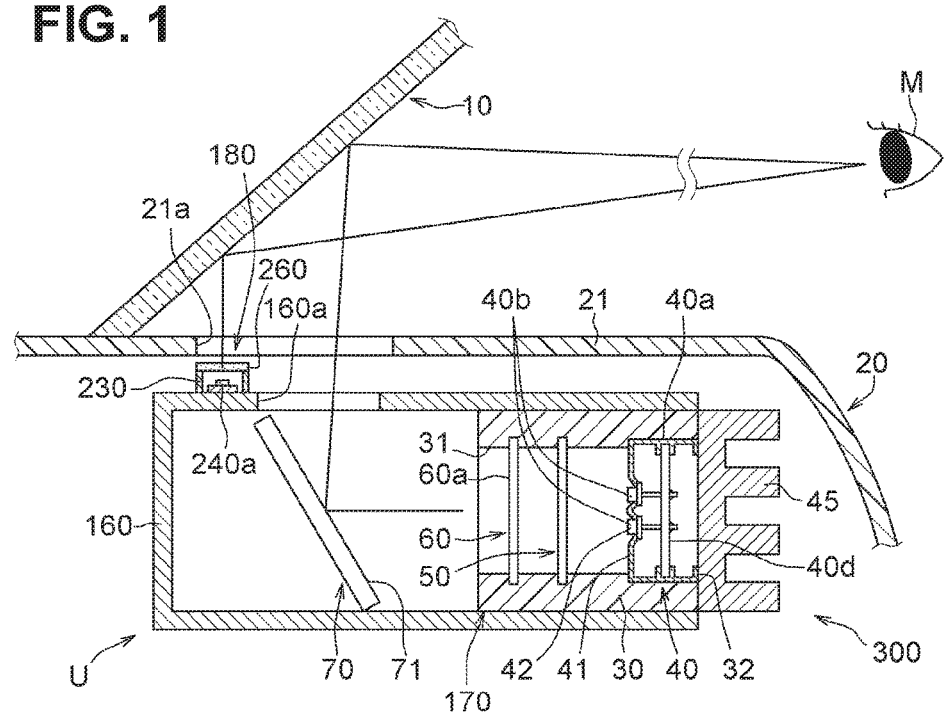
FIG. 1 is a sectional view schematically illustrating a head-up display according to the first embodiment.

A plurality of embodiments of the present disclosure will be described hereinafter referring to drawings. In the embodiments, a part that corresponds to a matter described in a preceding embodiment may be assigned with the same reference numeral, and redundant explanation for the part may be omitted. When only a part of a configuration is described in an embodiment, another preceding embodiment may be applied to the other parts of the configuration. The parts may be combined even if it is not explicitly described that the parts may be combined. The embodiments may be partially combined even if it is not explicitly described that the embodiments may be combined, provided there is no harm in the combination.

First Embodiment

Configuration of a head-up display 300 according to the first embodiment will be described. FIG. 1 depicts a sectional view schematically illustrating the head-up display 300 according to the present embodiment.

Referring to FIG. 1, a head-up display 300 for a vehicle includes a display unit U installed underneath a panel top 21 of an instrument panel 20. The display unit U includes a package 160, a first lighting unit 170, a second lighting unit 180, and a reflector 70.

The package 160 is installed underneath the panel top 21. The first lighting unit 170 and the reflector 70 are accommodated in the package 160. The package 160 has an opening 160a corresponding to an opening 21a of the panel top 21. The second lighting unit 180 is disposed on the exterior surface of the package 160 and located near the opening 160a.

The first lighting unit 170 includes a first cylindrical casing 30, a first lighting source 40, a light diffusion plate 50, a translucent LCD panel 60, and a heat sink 45. The first lighting unit 170 is operated as a primary display. The first cylindrical casing 30 is placed behind the instrument panel 20 as its horizontal axis lies in the front-rear direction of the vehicle and supported by the package 160. A front end opening 31 and a rear end opening 32 of the first cylindrical casing 30 face toward the front and the rear of the vehicle, respectively.

The first lighting source 40 includes a generally U-shaped cross-section frame 40a inserted into the rear part of the first cylindrical casing 30 as its horizontal axis lies coaxially with the first cylindrical casing 30. The U-shaped cross-section frame 40a is installed in the rear part of the first cylindrical casing 30 as its front wall 41 faces toward the front of the vehicle.

The first lighting source 40 includes a first LED group 40b. The first LED group 40b includes a plurality of LEDs 42 with low directivity. The LEDs 42 are inserted on the U-shaped cross-section frame 40a so that they emit light perpendicularly to the diffusion plate 50 and the LCD panel 60 through the front end opening 31.

The first lighting source 40 includes a wiring board 40d. The wiring board 40d is placed in parallel with the front wall 41. The LEDs 42 are electrically connected with the wiring board 40d via lead terminals.

The rim of the diffusion plate 50 is fitted into the interior wall of the first cylindrical casing 30. The diffusion plate 50 is placed in the middle part of the first cylindrical casing 30 orthogonal to the optical axis of the LEDs 42. Light from LEDs 42 is diffused by the diffusion plate 50 to provide the diffused light. The diffused light impinges on an entire display surface 60a.

The rim of the LCD panel 60 is fitted into the interior wall of the first cylindrical casing 30 near its front end opening 31. The LCD panel 60 receives the diffused light from the diffusion plate 50. The diffused light is outputted as the first display light via the front end opening 31. The first display light is utilized for displaying low priority information.

Under electronic control, the diffused light impinges on the LCD panel 60, and the low priority information is displayed on the entire display surface 60a. Then, the low priority information is outputted as the first display light.

The first lighting unit 170 includes a heat sink 45 installed on the first cylindrical casing 30. The heat sink 45 has a base portion and a plurality of fins extending from the base portion to increase radiation surface area. The heat sink 45 is configured to emit heat generated at the LEDs 42 from the radiation surface outward of a cavity of the first cylindrical casing 30. The heat sink 45 closes the rear end opening 32 of the first cylindrical casing 30 so that an accommodating space for the LEDs 42 is created in the first cylindrical casing 60 by the diffusion plate 50 on the front side from the LEDs 42 and the heat sink 45 on the rear side from the LEDs 42.

The head-up display 300 includes a reflector 70 installed underneath the panel top 21. The reflector 70 is tilted so that its reflecting surface 71 is visible from both the windshield 10 through the openings 21a, 160a and the display surface 60a. The first display light reflected off the reflecting surface 71 is outputted to an interior surface of the front windshield 10 through the opening 160a of the package 160 and the opening 21a of the panel top 21. Then, the display light is reflected in the opposite direction of driver's line of sight, and forms virtual images of the display information in front of the windshield 10.

The second lighting unit 180 includes a second cylindrical casing 230, a second lighting source 240, and a graphic board 260. The second lighting unit 180 has higher thermal resistance than the first lighting unit 170, so that the second lighting unit 180 is capable to operate in a higher temperature condition than the first lighting unit 170. The second lighting unit 180 is operated as a secondary display.

The second cylindrical casing 230 is installed on the package 160 independently from the first cylindrical casing 30. In other words, the second cylindrical casing 230 is disposed outside of the first cylindrical casing 30. In the current embodiment, the second cylindrical casing 230 is installed on an exterior surface of the package 160 so that the second lighting unit 180 faces the windshield 10. The graphic board 260 is disposed on the second cylindrical casing 230 so that the second lighting source 240 is accommodated by the second cylindrical casing 230 and the graphic board 260.

Figure 2:
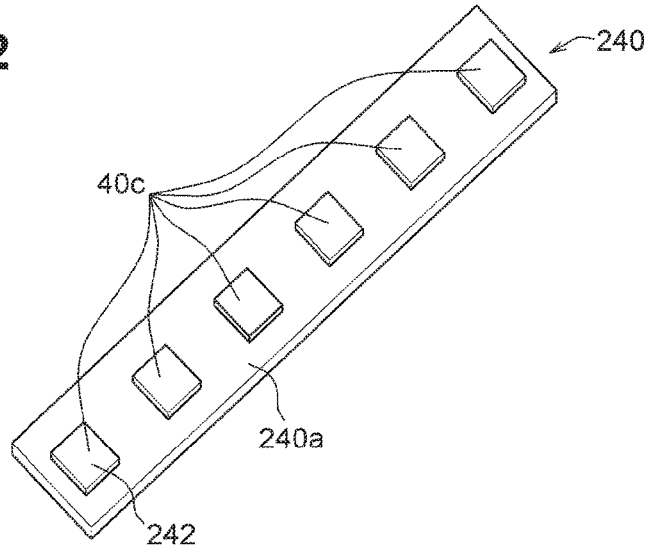
FIG. 2 is a perspective view schematically illustrating a second lighting source according to the first embodiment.

FIG. 2 depicts a perspective view schematically illustrating the second lighting source 240 according to the present embodiment. Referring to FIG. 2, the second lighting source 240 includes a bar-shaped frame 240a and a second LED group 40c. The second LED group 40c includes six LEDs 242 with high directivity. The LEDs 242 of the second LED group 40c have higher directivity than the LEDs 42 of the first LED group 40b. In other words, each LEDs 242 has a higher lighting intensity value than the LED 42. The bar-shaped frame 240a has the LEDs 242 along the longitudinal direction thereof. Specifically, the LEDs 242 are inserted on the bar-shaped frame 240a so that they emit light perpendicularly to the graphic board 260.

Figure 3:
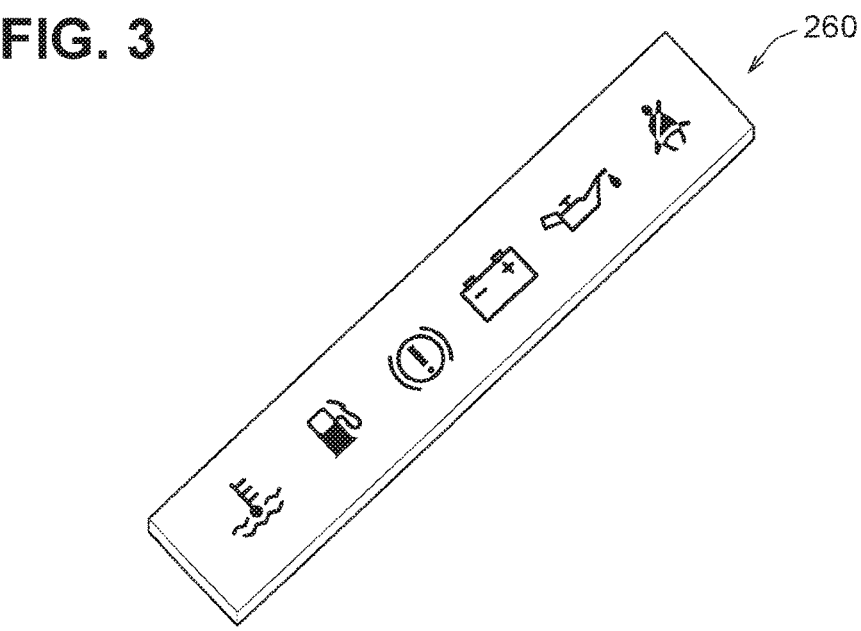
FIG. 3 is a perspective view schematically illustrating a graphic board according to the first embodiment.

FIG. 3 depicts a perspective view schematically illustrating the graphic board 260 according to the present embodiment. Referring to FIG. 3, the graphic board 260 has a plurality of translucent warning icons, such as a low oil pressure warning icon, a battery warning icon, a seat belt reminder icon, a brake warning icon, a fuel warning icon, a temperature warning icon, and so forth, pre-printed corresponding to the LEDs 242. In the current embodiment, the warning icons are printed respective to each LEDs 242.

The graphic board 260 receives light from the LEDs 242 and outputs the light from the plurality of translucent warning icons to the windshield 10. In other words, the light from the LEDs 242 is outputted as the second display light via the graphic board 260. The second display light is utilized for displaying high priority information.

The second lighting unit 180 includes the graphic board 260 instead of a LED panel like the first lighting unit 170. Thereby, the second lighting unit 180 has higher thermal resistance than the first lighting unit 170. In other words, the second lighting unit 180 is capable to operate in a higher temperature condition than the first lighting unit 170.

The LEDs 42 with low directivity and the LEDs 242 with high directivity are used for the first LED group 40b and the second LED group 40c, respectively. In the current embodiment, chip-type or dome-type white LEDs are used for the LEDs 42. Red LEDs are used for the LEDs 242.

Figure 4:
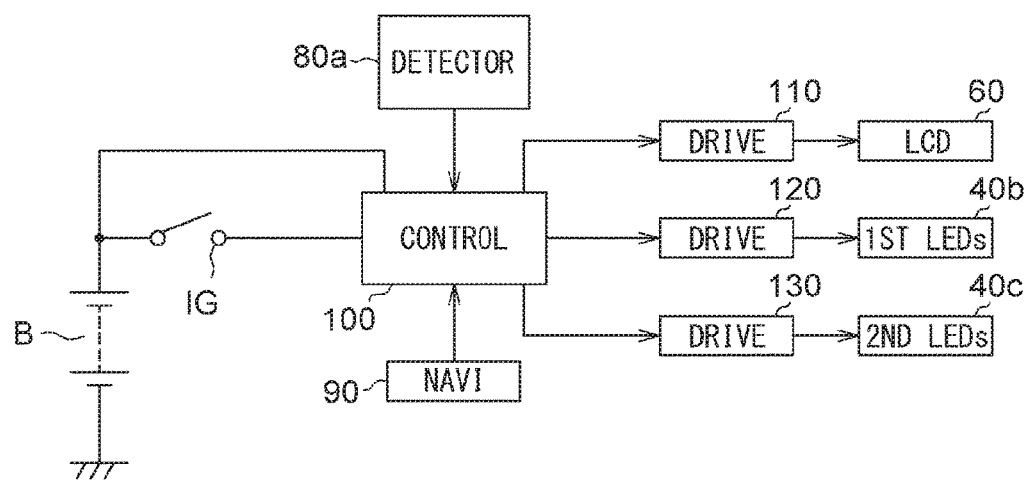
FIG. 4 is an electric block diagram illustrating a head-up display according to the first embodiment.

FIG. 4 depicts an electric block diagram illustrating the head-up display 300 according to the present embodiment. Referring to FIG. 4, electrical components of the head-up display includes a plurality of detectors 80, a navigator 90, a control circuit 100, driving circuits 110, 120, and 130 for the LCD panel 60, the first LED group 40b, and the second LED group 40c.

The plurality of detectors 80, installed in the vehicle, detect failures of vehicle components, such as an engine oil system, a battery, a seatbelt, a parking brake, a coolant temperature, a fuel tank, and so forth. The onboard navigator 90 picks up navigation information for the vehicle and outputs it as data.

The control circuit 100 includes a microcomputer as its main component, and drives driving circuits 110, 120 and 130 for controlling displays on the LCD panel 60 and light emission of the first and second LED groups of LEDs 40b and 40c. A voltage is applied to various circuits including the circuit 100 from an onboard battery B via an ignition switch IG. When the vehicle is in motion with the switch IG being turned on, the voltage is supplied to the control circuit 100 by the battery B.

The control circuit 100 determines which control to perform. For example, when navigation information indicates a route or a distance from the current location to a destination, it performs a control to display the low priority information. When failure information indicates a warning icon, it performs a control to display the high priority information.

The control circuit 100 controls the driving circuit 110 to display the low priority information on the entire display surface 60a. This control is performed based on the navigation information from the navigator 90 along with the light emitting operation of the first LED group 40b.

The control circuit 100 drives the driving circuit 120 to control the LEDs 42 to emit light based on the light emitting operation directed by its microcomputer. The LEDs 42 emit light toward the diffusion plate 50. The light diffused by the diffusion plate 50 then travels toward the LCD panel 60. Since the LEDs 42 are chip-type or dome-type LEDs, they have low directivity and a wide light distribution area. Therefore, the first diffused light impinges on the entire back surface of the LCD panel 60.

When the navigator 90 outputs a travel route or navigation information, the control circuit 100 performs a light emitting operation for the first LED group 40b to display the low priority information. The control circuit 100 drives the driving circuit 130 based on the light emitting operation to control the LEDs 42 to emit light. The LEDs 42 emit light toward the diffusion plate 50 which diffuses the light toward the LCD panel 60 as the diffused light.

The control circuit 100 drives the driving circuit 110 to display the low priority information on the LCD panel 60 based on the display process. The LCD panel 60 displays the low priority information on the display, utilizing the diffused light. The first display light then impinges on the reflector 70. The first display light reflected off the reflecting surface 71 travels toward the interior surface of the front windshield 10 through the opening 21a. It is then reflected off the front windshield 10 in the opposite direction of driver M's line of sight, and forms virtual images of the display information in front of the windshield 10.

Figure 5:
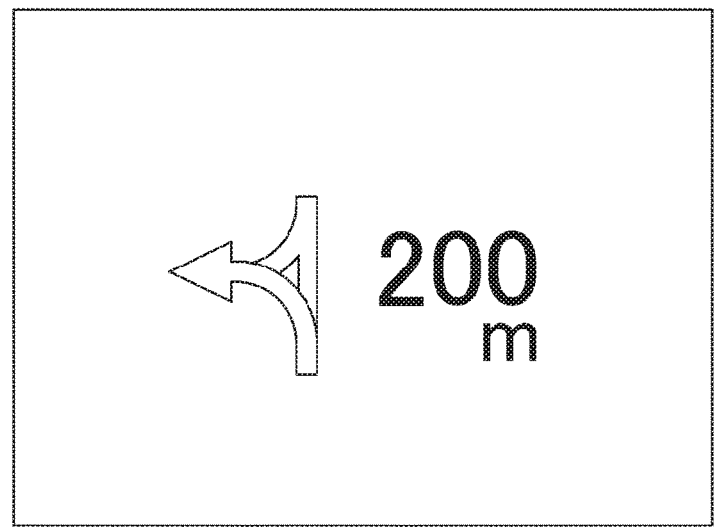
FIG. 5 is an exemplary view showing low priority information displayed as virtual images in the first embodiment.

FIG. 5 depicts an exemplary view showing the low priority information displayed as the virtual images in the current embodiment. As shown in FIG. 5, the virtual images of a route and a distance from the current location to a destination are displayed in the area corresponding to the surface in front of the windshield 10. The first display light is inverted by the reflector 70 and forms virtual images in front of the windshield 10. As a result, the virtual images are inversions of the images displayed on the LCD panel 60.

On the other hand, the control circuit 100 controls the driving circuit 130 to display the high priority information on the windshield 10. This control is performed based on the failure information from the plurality of detectors 80. The control circuit 100 drives the driving circuit 130 to control the LEDs 242 to emit light based on the lighting emitting operation directed by its microcomputer. The LEDs 242 emit red light toward the windshield 10.

When one of the detectors 80 detects a failure of engine oil pressure, the detector 80 outputs the failure signal as failure information. The control circuit 100 performs the light emitting operation of the second LED group 40c and displaying process of the high priority information according to the failure signal.

Figure 6:
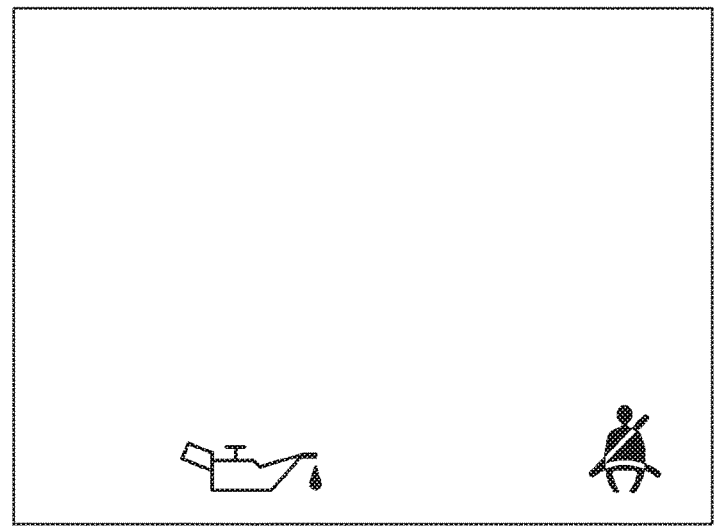
FIG. 6 is an exemplary view showing high priority information displayed as virtual images in the first embodiment.

FIG. 6 depicts an exemplary view showing the high priority information displayed as the virtual images in the current embodiment. As shown in FIG. 6, the virtual images of an engine oil pressure waring icon and a seat belt reminder icon are displayed in the windshield 10. The second display light is directed from the second lighting unit 180 to the windshield 10. As a result, the virtual images with high intensity can direct the attention of the driver M to the warning icons.

The LEDs 42 of the first LED group 40b have low directivity, and the LEDs 43 of the second LED group 40c have high directivity. In other words, the LEDs 42 of the first LED group 40b have low intensity, and the LEDs 43 of the second LED group 40c have high intensity. Thereby, the two different intensities of information can be selectively displayed in front of the windshield 10.

Furthermore, the second lighting unit 180 is installed on the package 160 independently from the first lighting unit 170 so that heat generated at the high intensity LEDs 242 radiates separately from the first lighting unit 170. Thereby, the head-up display 300 can reduce a possibility of thermal damage of the first lighting unit 170 from heat generated from the second lighting unit 180. As a result, size of the package 160 can be reduced due to size reduction of the heat sink 45 while the second lighting unit 180 has the LEDs 242 with high directivity.

Second Embodiment

Figure 7:
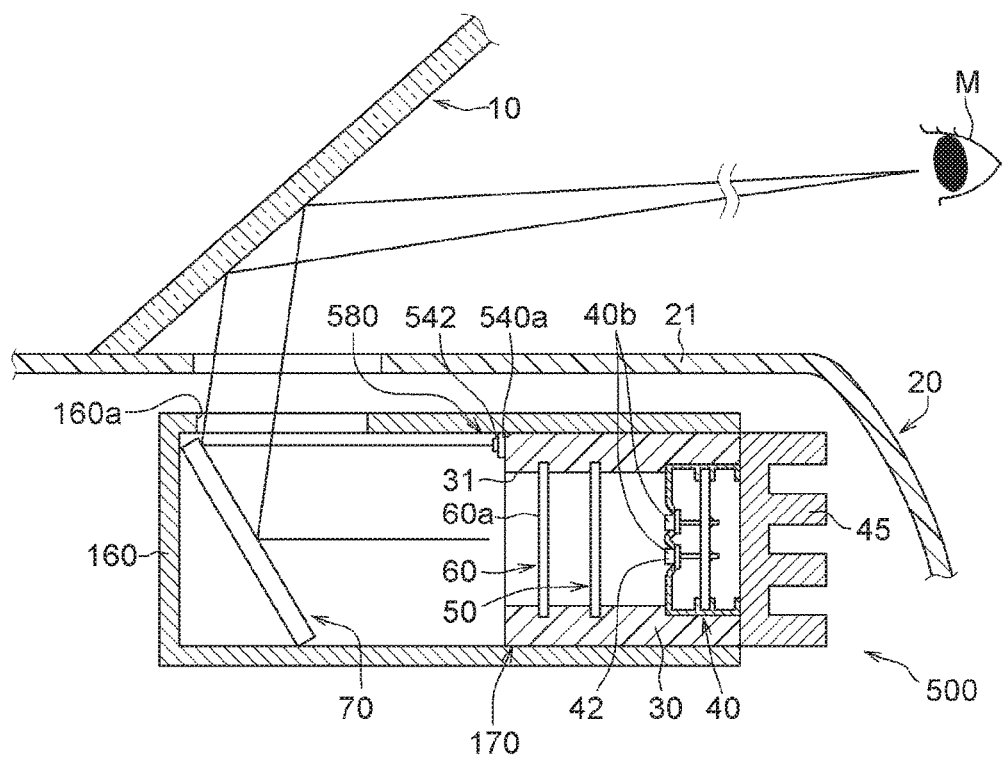
FIG. 7 is a sectional view schematically illustrating a head-up display according to the second embodiment.

Different aspect of the second embodiment from the first embodiment will be described mainly with reference to FIG. 7. Configuration of a head-up display 500 according to the second embodiment will be described. FIG. 7 depicts a sectional view schematically illustrating the head-up display 500 according to the present embodiment.

Referring to FIG. 7, the head-up display 500 includes a second lighting unit 580 instead of the second lighting unit 180 of the head-up display 300 according to the first embodiment. The second lighting unit 580 is installed on an exterior surface of the first cylindrical casing 30. Specifically, the second lighting unit 580 is disposed outside of the first cylindrical casing 30, near the front end opening 31. The second lighting unit 580 is accommodated by the package 160 as well as reflector 70.

The second lighting unit 580 includes a bar-shaped frame 540a and a plurality of LEDs 542 with high directivity. The bar-shaped frame 540a has the plurality of LEDs 542 along the longitudinal direction thereof. The plurality of LEDs 542 emits high intensity light as the second display light toward the reflector 70. The second display light reflected off the reflecting surface 71 is outputted to the interior surface of the front windshield 10 through the opening 160a of the package 160. Then, the second display light is reflected in the opposite direction of driver's line of sight, and forms warning light of the display information in front of the windshield 10.

Other Embodiments

In the first example, the second lighting unit 180 is disposed on the exterior surface of the package 160. The second lighting unit 180, however, is not limited to such a structure. The second lighting unit may be installed on the package anywhere as long as the second lighting unit is outside of the first cylindrical casing. The second display light may be directed to the windshield or may be reflected by a reflector toward the windshield.

In the first example, the second LED group 40c includes six LEDs 242 and the graphic board 260 has the six warning icons pre-printed. The number of the LEDs and the number of the warning icons, however, is not limited to six. The numbers of them may be from one to more than six.

In the first example, the first lighting unit 170 includes the LCD panel 60. The first lighting unit 170, however, is not limited to such a structure. It is further noted that, the first lighting unit may include a digital light processing (DLP) panel instead of the LCD panel.

In the first example, the second lighting unit 180 includes the LEDs 242. The second lighting unit 180, however, is not limited to such a structure. It is further noted that, the second lighting unit may include a laser device, which generates a laser beam, instead of the LEDs.

In the first example, the head-up display 300 is for an automobile. The head-up display 300, however, is not limited to such a use. It is further noted that, the head-up display may be used for a boat, a train, and an aircraft.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed. As used herein, the term "and/or" includes any and all combinations of one or more of the associated listed items.

What is claimed is:

1. A head-up display comprising:
a first lighting unit configured to display first information on a windshield, the first lighting unit including a first lighting source that emits light for the windshield as the first information and a first cylindrical casing that accommodates the first lighting source therein;
a second lighting unit configured to display second information on the windshield, the second lighting unit including a second lighting source that emits light for the windshield as the second information; and
a package disposed under the windshield, the first and second lighting units being installed thereon; wherein the second lighting unit is installed on the package independently from the first lighting unit;
wherein:
the second lighting source is disposed outside of the first cylindrical casing;
the second lighting unit is installed on an exterior surface of the package so that the second lighting unit faces the windshield;
the second lighting source includes a bar-shaped frame and a plurality of LEDs along the longitudinal direction of the bar-shaped frame;
the second lighting source further includes a graphic board that has a plurality of translucent warning icons pre-printed corresponding to the plurality of the LEDs of the second lighting source; and
the graphic board receives light from the plurality of LEDs of the second lighting source and outputs the light from the plurality of translucent warning icons to the windshield such that the light from the plurality of LEDs of the second lighting source is output as the second display light via the graphic board.

2. The head-up display according to claim 1, wherein the first lighting source includes LEDs with lower directivity to display the first information as lower priority information, and
the second lighting source includes LEDs with higher directivity to display the second information as higher priority information.

3. The head-up display according to claim 1, wherein the first lighting unit has lower thermal resistance,
the second lighting unit has higher thermal resistance, and
the second lighting unit is capable to operate in a higher temperature condition than the first lighting unit.

4. The head-up display according to claim 1, wherein the second lighting source further includes a second cylindrical casing that accommodates the second lighting source therein, and
the second cylindrical casing is installed on the package independently from the first cylindrical casing.

5. The head-up display according to claim 1, wherein the first lighting unit further includes a liquid crystal display (LCD) panel having a display surface, the LCD panel being accommodated in the first cylindrical casing,
the second lighting source is disposed outside of the first cylindrical casing.

6. The head-up display according to claim 1, wherein the first lighting unit further includes an OLP panel having a display surface, the digital light processing (OLP) panel being accommodated in the first cylindrical casing,
the second lighting source is disposed outside of the first cylindrical casing.

7. The head-up display according to claim 1, further comprising:
- a reflector accommodated by the package, the reflector being visible from both the windshield and the first lighting unit; wherein
- the second lighting unit is installed on an outer surface of the first cylindrical casing so that the reflector is visible from the second lighting unit as well as the first lighting unit.

8. The head-up display according to claim 1, wherein the plurality of translucent warning icons include a low oil pressure warning icon, a battery warning icon, a seat belt reminder icon, a brake warning icon, a fuel warning icon, and a temperature warning icon.

9. The head-up display according to claim 1, wherein
- the first lighting unit further includes a heat sink that is installed on the first cylindrical casing, and
- the heat sink is configured to emit heat generated at the LEDs from the radiation surface outward of a cavity of the first cylindrical casing.

10. The head-up display according to claim 1, further comprising:
- a controller including a detector, which detects a failure of a vehicle component and outputs a failure information, and a driving circuit, which drives the second lighting unit, wherein
- the controller performs a light emitting operation for the second lighting unit 30 to display the second information based on the failure information when the failure information indicates warning of the vehicle component.

11. The head-up display according to claim 1, further comprising:
- a controller including a navigator, which picks up navigation information for a vehicle and outputs the navigation information, and a driving circuit, which drives the first lighting unit, wherein
- the controller performs a light emitting operation for the first lighting unit to display the first information based on the navigation information when the navigation information indicates a route or a distance from a current location to a destination.

\* \* \* \* \*